(12) United States Patent
Xing et al.

(10) Patent No.: US 12,278,552 B2
(45) Date of Patent: Apr. 15, 2025

(54) CONVERTER CIRCUITS

(71) Applicant: Hamilton Sundstrand Corporation, Charlotte, NC (US)

(72) Inventors: Lei Xing, South Windsor, CT (US); Suman Dwari, East Hartford, CT (US); W. Warren Chen, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 22 days.

(21) Appl. No.: 18/127,577

(22) Filed: Mar. 28, 2023

(65) Prior Publication Data

US 2024/0275262 A1 Aug. 15, 2024

Related U.S. Application Data

(63) Continuation-in-part of application No. 18/107,997, filed on Feb. 9, 2023, now abandoned.

(51) Int. Cl.
*B60L 50/00* (2019.01)
*B64D 41/00* (2006.01)
*H02M 1/00* (2007.01)
*H02M 3/335* (2006.01)

(52) U.S. Cl.
CPC ........... *H02M 1/0095* (2021.05); *B60L 50/00* (2019.02); *B64D 41/00* (2013.01); *H02M 3/33584* (2013.01); *B60L 2200/10* (2013.01); *B60L 2210/00* (2013.01); *B64D 2221/00* (2013.01)

(58) Field of Classification Search
CPC . H02M 1/0095; H02M 3/33584; B60L 50/00; B60L 2200/10; B60L 2210/00; B64D 41/00; B64D 2221/00
USPC .......................................................... 307/9.1
See application file for complete search history.

(56) References Cited

U.S. PATENT DOCUMENTS

| 6,031,738 | A | 2/2000 | Lipo et al. |
|---|---|---|---|
| 6,384,491 | B1 * | 5/2002 | O'Meara ................. H02J 7/345 307/86 |
| 9,923,484 | B2 | 3/2018 | Vahedi et al. |
| 9,991,820 | B2 | 6/2018 | Kuai |
| 10,199,822 | B2 | 2/2019 | Shen et al. |
| 10,924,031 | B2 | 2/2021 | Li et al. |
| 10,951,032 | B2 | 3/2021 | Mondal |
| 11,296,590 | B2 | 4/2022 | Yoscovich et al. |
| 2021/0021194 | A1 * | 1/2021 | Finger ................. H02M 3/1584 |

(Continued)

OTHER PUBLICATIONS

European Search Report dated Aug. 8, 2024 in connection with European Patent Application No. 24167464.7, 10 pages.

(Continued)

*Primary Examiner* — Rexford N Barnie
*Assistant Examiner* — Xuan Ly (57) ABSTRACT

A system can include a bi-directional converter circuit comprising a plurality of switches and a flying capacitor configured to experience a low voltage or a high voltage, and a control module operatively connected to the plurality of switches to control a state of the plurality of switches. The control module can be configured to receive a sense signal indicative of a flying capacitor voltage and to control the one or more switches of the plurality of switches to charge or discharge the flying capacitor to maintain a target voltage or target voltage range.

21 Claims, 4 Drawing Sheets

(56) References Cited

U.S. PATENT DOCUMENTS

2021/0296983 A1\*  9/2021  Rentmeister ........ H02M 1/0095
2023/0155507 A1\*  5/2023  Lee ........................... H02J 7/02
                                                          363/13

OTHER PUBLICATIONS

Kou et al., "DC-Link Capacitor Voltage Balancing Technique for Phase-Shifted PWM-Based Seven-Switch Five-Level ANPC Inverter," IEEE Applied Power Electronics Conference and Exposition (APEC), Mar. 2017, 8 pages.

Wang et al., "A New Six-Switch Five-Level Active Neutral Point Clamped Inverter for PV Applications," IEEE Transactions on Power Electronics, vol. 32, No. 9, Sep. 2017, 16 pages.

Wang et al., "Switching State Sequences-Based Modulation Scheme for T-Type 5L-ANPC Converter," IEEE Access, vol. 7, Jul. 2019, 12 pages.

\* cited by examiner

State B Charging

FIG. 2B

State C Discharging

FIG. 2C

| State | $v_{fca}$ | $i_a$ | $S_9, S_{10}, S_4, S_6$ | $S_1, S_2$ |
|---|---|---|---|---|
| Discharging B | $v_{fca} > V_{ref}$ | $i_a > 0$ | $d_a - \Delta d$ | $d_a + \Delta d$ |
| | | $i_a \leq 0$ | $d_a + \Delta d$ | $d_a - \Delta d$ |
| Charging C | $v_{fca} \leq V_{ref}$ | $i_a > 0$ | $d_a + \Delta d$ | $d_a - \Delta d$ |
| | | $i_a \leq 0$ | $d_a - \Delta d$ | $d_a + \Delta d$ |

Fig. 3

CONVERTER CIRCUITS

CROSS REFERENCE TO RELATED APPLICATIONS

This application is a continuation-in-part of U.S. patent application Ser. No. 18/107,997, filed Feb. 9, 2023, the entire content of which is incorporated by reference herein.

STATEMENT OF GOVERNMENT RIGHTS

This invention was made with government support under contract no. DE-AR0000889 awarded by the Department of Energy. The government has certain rights in the invention.

FIELD

This disclosure relates to converter circuits, e.g., multi-level converter circuits.

BACKGROUND

Multi-level converters are beneficial for high power, high voltage power electronics applications that demand high power density with high power quality, such as in certain aerospace applications. Conventional multi-level converters, such as a diode clamped 5-level converter, traditionally require additional auxiliary circuits to maintain the voltage level of the converters and normally include of large number of components. This increases cost, reduces power density, produces larger losses, and decreases reliability of the converter. However, certain flying capacitor based active neutral point clamp (ANPC) converters use a significantly reduced number of components with low losses, and can potentially achieve higher power density, higher efficiency, and higher reliability with low cost compared to conventional ANPC converter. The flying capacitors provide the additional voltage level to achieve multi-level operation, but the voltage across them must be maintained to achieve such operation. However, traditional systems do not provide voltage balancing of the flying capacitor without any auxiliary circuits.

Such conventional methods and systems have generally been considered satisfactory for their intended purpose. However, there is still a need in the art for improvements. The present disclosure provides a solution for this need.

SUMMARY

A system can include a bi-directional converter circuit comprising a plurality of switches and a flying capacitor configured to experience a low voltage or a high voltage, and a control module operatively connected to the plurality of switches to control a state of the plurality of switches. The control module can be configured to receive a sense signal indicative of a flying capacitor voltage and to control the one or more switches of the plurality of switches to charge or discharge the flying capacitor to maintain a target voltage or target voltage range.

The control module can be configured to determine if the flying capacitor voltage is low, and to control the one or more switches of the plurality of switches to charge flying capacitor until the flying capacitor voltage reaches the target voltage or target voltage range. The control module can be configured to determine if the flying capacitor voltage is high, and to control the one or more switches of the plurality of switches to discharge the flying capacitor until the flying capacitor voltage reaches the target voltage Vref or a target voltage range.

The control module can include a sum block configured to compare the target voltage Vref to the flying capacitor voltage indicated by the sense signal to output a difference voltage signal. The control module can include a gain block configured to apply a predetermined gain to the difference voltage signal.

The control module can include a multiplication block configured to receive the gained difference voltage signal and multiply the gained difference voltage signal by the polarity of a circuit current i, wherein the multiplication block outputs a duty parameter $\Delta d$. The control module can include a first duty command sum block and a second duty command sum block connected to the multiplication module to receive the duty parameter $\Delta d$. The first duty command sum block can be configured to add the duty parameter $\Delta d$ to a duty command $d_a$ to output a first modulator duty comment signal $d_a + \Delta d$, and the second duty command sum block can be configured to subtract the duty parameter $\Delta d$ from the duty command $d_a$ to output a second modulator duty command signal $d_a - \Delta d$.

The control module can include a first modulator module operatively connected to the first duty command sum block to receive the first modulator duty comment signal $d_a + \Delta d$, and to output a control signal for each of a first group of switches of the plurality of switches, and a second modulator module operatively connected to the second duty command sum block to receive the second modulator duty command signal $d_a - \Delta d$, and to output a control signal for each of a second group of switches the plurality of switches, wherein the first group of switches is different than the second group of switches.

The first modulator module can be configured to receive a first modulator reference signal and the second modulator module can be configured to receive a second modulator reference signal. The second modulator reference signal can be off phase from the first modulator reference signal by 180 degrees. In certain embodiments, the first modulator reference signal and the second modulator reference signal can be triangle waves.

In certain embodiments, the plurality of switches includes a first switch, a second switch, a third switch, a fourth switch, a fifth switch, a sixth switch, a seventh switch, and an eighth switch. The first switch and the second switch can be connected to a neutral point in parallel. The first switch, the seventh switch, and the third switch can be connected to a first side of the flying capacitor in parallel. The second switch, the eighth switch, and the sixth switch can be connected to a second side of the flying capacitor in parallel. The fourth switch can be disposed in series with the third switch and oriented in reverse. The fifth switch can be disposed in series with the sixth switch and oriented in reverse. The fourth switch and the fifth switch can be connected in parallel to a midpoint between a first DC capacitor and a second DC capacitor.

The control module can be configured to determine which switches to turn on or off based on whether the flying capacitor voltage is above or below the target voltage or target voltage range. In certain embodiments, the first modulator module can be configured to control the fourth switch, the sixth switch, the seventh switch and the eighth switch. The second modulator module can be configured to control the first switch and the second switch.

In accordance with at least one aspect of this disclosure, an aircraft can include a bidirectional converter system. The system can include any suitable embodiment of a system disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
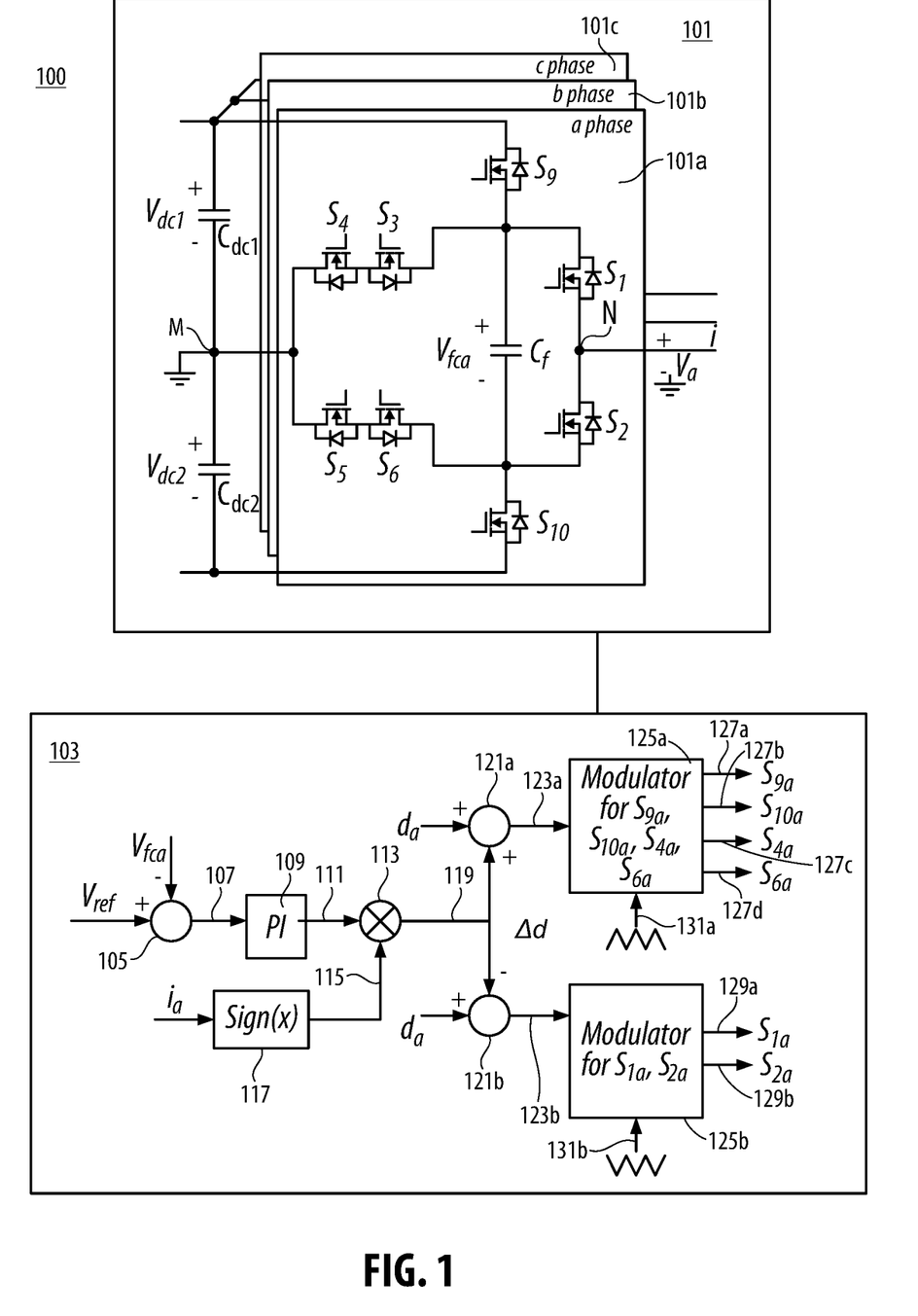
FIG. 1 is a schematic diagram of an embodiment of a system in accordance with this disclosure.
Figure 2A:
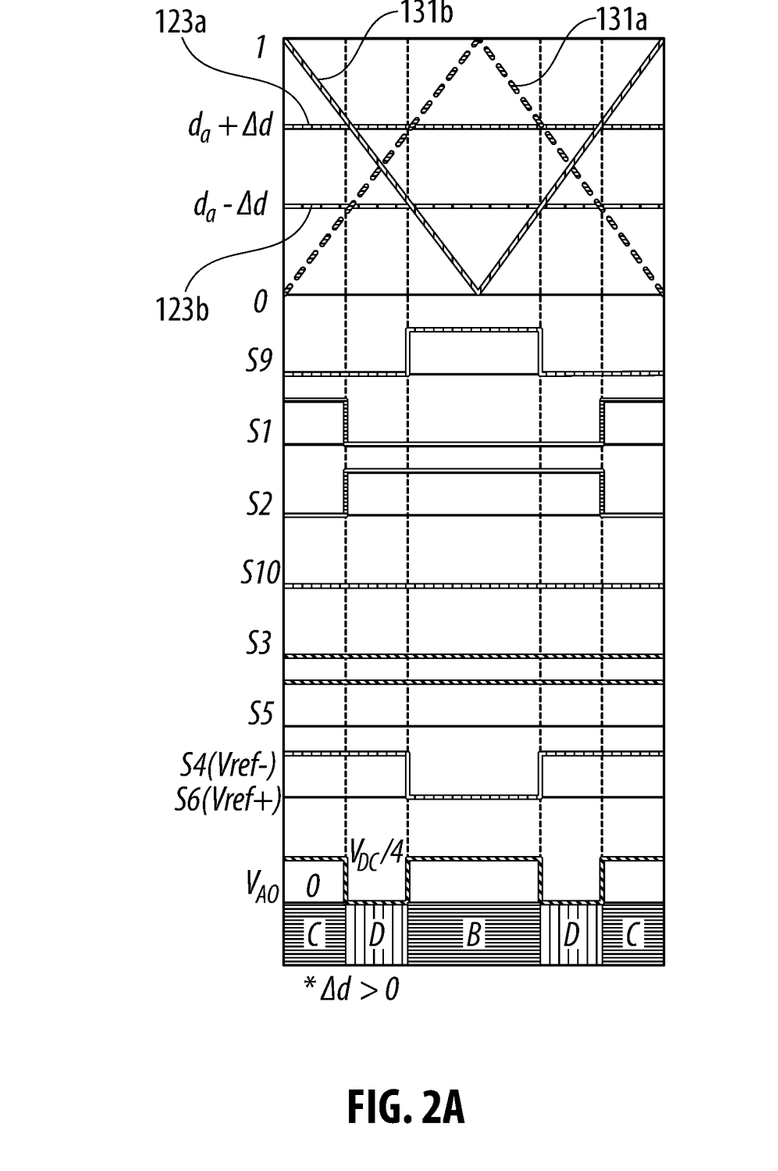
FIG. 2A is a schematic diagram showing an embodiment of switch logic relative to two reference signals and two duty cycle command lines.
Figure 2B:
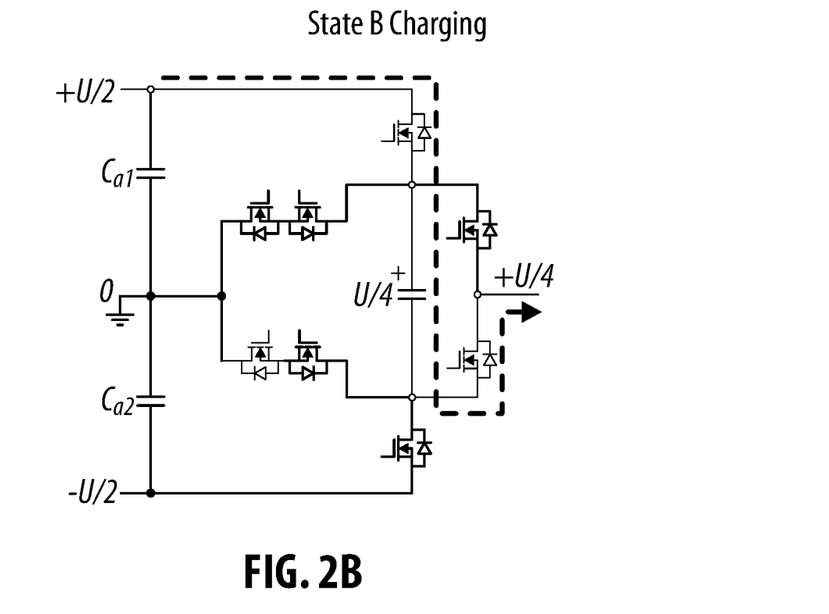
FIG. 2B shows an example of switching control for charging the flying capacitor in accordance with FIG. 2A.
Figure 2C:
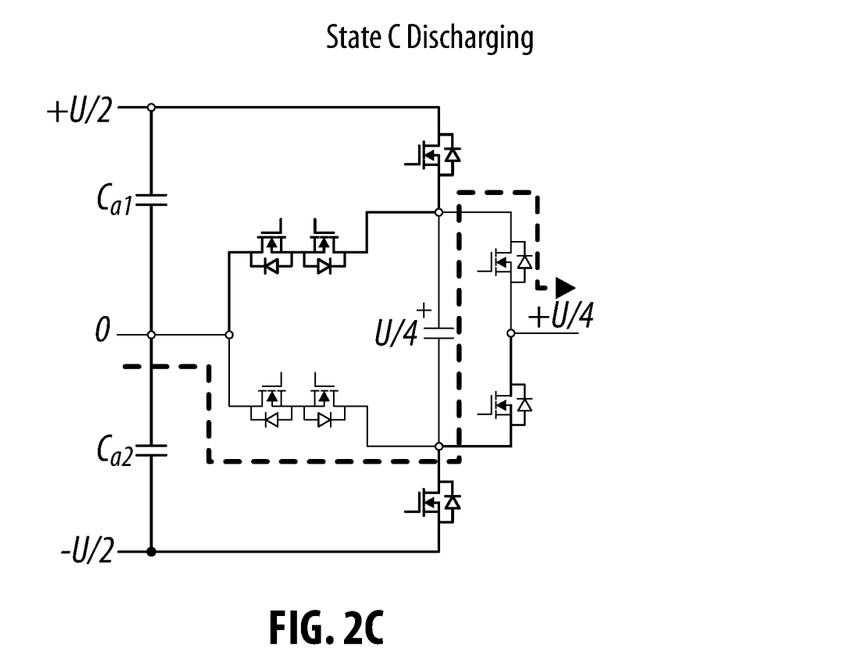
FIG. 2C shows an example of switching control for discharging the flying capacitor in accordance with FIG. 2A.
Figure 3:
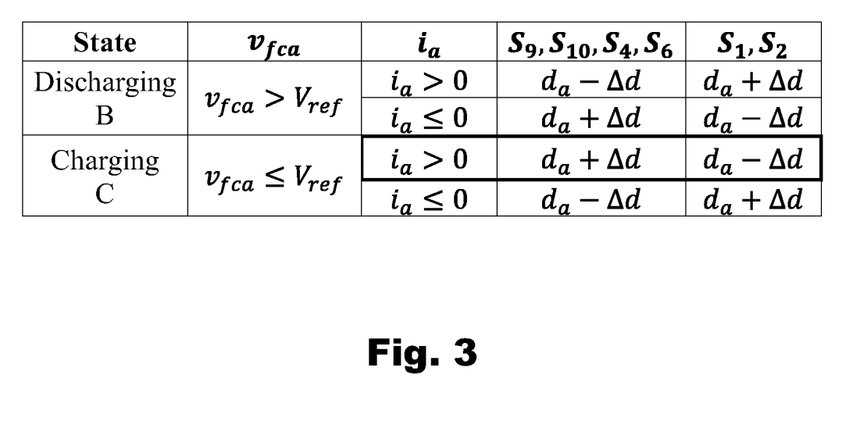
FIG. 3 shows an embodiment of a logic table used by embodiments of modulators to control switching in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A-3.

Referring to FIG. 1, a system 100 can include a bi-directional converter circuit 101 comprising a plurality of switches S1, S2, S3, S4, S5, S6, S9, S10, and a flying capacitor Cf configured to experience a low voltage or a high voltage. The system 100 can include a control module 103 operatively connected to the plurality of switches S1, S2, S3, S4, S5, S6, S9, S10 to control a state of the plurality of switches S1, S2, S3, S4, S5, S6, S9, S10. The control module 103 can be configured to receive a sense signal indicative of a flying capacitor voltage Vfca and to control the one or more switches S1, S2, S3, S4, S5, S6, S9, S10 of the plurality of switches switches S1, S2, S3, S4, S5, S6, S9, S10 to charge or discharge the flying capacitor Cf to maintain a target voltage Vref or target voltage range.

As shown, the converter circuit 101 can include a plurality of phases 101a, 101b, 101c. Each phase 101a, 101b, 101c can include a respective flying capacitor Cf, for example (e.g., each phase can have the same arrangement of components). As used herein, Vfc is the voltage of a flying capacitor Cf generally (e.g., wherein Vfca is the voltage of the flying capacitor Cf of the first phase 101a and used as an example for this disclosure). For simplicity, the drawings show control of the first phase 101a (with the switches shown having phase designation (e.g., S1a, S2a, etc., which correlate to switches S1, S2, etc., for example), but the control module 103 can be configured to control each phase 101a, 101b, 101c, for example. Any suitable number of phases (e.g., one, two, three as shown, etc.) are contemplated herein.

As shown, the control module 103 can be configured to determine if the flying capacitor voltage Vfca is low, and to control the one or more switches of the plurality of switches S1, S2, S3, S4, S5, S6, S9, S10 to charge flying capacitor Cf until the flying capacitor voltage Vfca reaches the target voltage Vref or target voltage range. The control module 103 can be configured to determine if the flying capacitor voltage Vfca is high, and to control the one or more switches (e.g., S1, S2, S4, S6, S9, S10 as shown in FIGS. 1, 2, and 3) of the plurality of switches S1, S2, S3, S4, S5, S6, S9, S10 to discharge the flying capacitor Cf until the flying capacitor voltage Vfca reaches the target voltage Vref or a target voltage range.

The control module 103 can include a sum block 105 configured to compare the target voltage Vref to the flying capacitor voltage Vfca indicated by the sense signal to output a difference voltage signal 107. The control module 103 can include a gain block 109 configured to apply a predetermined gain to the difference voltage signal 107 (e.g., and output a gained difference voltage signal 111). The gain block 109 can be a proportional integral (PI) controller for example.

The control module 103 can include a multiplication block 113 configured to receive the gained difference voltage signal 111 and multiply the gained difference voltage signal 111 by the polarity of a circuit current i (e.g., $i_a$ of the first phase as shown). For example, a sign block 117 can receive the current $i_a$ and output a sign signal (e.g., negative or positive) representing the polarity of the current $i_a$. The multiplication block 113 can output a duty parameter Δd 119. The control module 103 can include a first duty command sum block 121a and a second duty command sum block 121b connected to the multiplication module 113 to receive the duty parameter Δd 119. The first duty command sum block 121a can be configured to add the duty parameter Δd to a duty command $d_a$ to output a first modulator duty comment signal $d_a+\Delta d$ 123a. The second duty command sum block 121b can be configured to subtract the duty parameter Δd from the duty command $d_a$ to output a second modulator duty command signal $d_a-\Delta d$ 123b.

The control module 103 can include a first modulator module 125a operatively connected to the first duty command sum block 121a to receive the first modulator duty comment signal $d_a+\Delta d$ 123a. The first modulator module 125a can be configured to output a control signal 127a, b, c, d for each of a first group of switches (e.g., S4a, S6a, S9a, S10a as shown) of the plurality of switches S1, S2, S3, S4, S5, S6, S9, S10. The control module 103 can include a second modulator module 125b operatively connected to the second duty command sum block 121b to receive the second modulator duty command signal $d_a-\Delta d$, and to output a control signal 129a, 129b for each of a second group of switches (e.g., S1a, S2a as shown) the plurality of switches S1, S2, S3, S4, S5, S6, S9, S10. As shown, the first group of switches can be different than the second group of switches.

The first modulator module 125a can be configured to receive a first modulator reference signal 131a and the second modulator module 125b can be configured to receive a second modulator reference signal 131b. The second modulator reference signal 131b can be off phase from the first modulator reference signal 131a by 180 degrees, for example (e.g., as shown in FIGS. 1-2C). In certain embodiments, the first modulator reference signal 131a and the second modulator reference signal 131b can be triangle waves (e.g., as shown).

In certain embodiments, as shown in circuit 101, the plurality of switches S1, S2, S3, S4, S5, S6, S9, S10 can include a first switch S1, a second switch S2, a third switch S3, a fourth switch S4, a fifth switch S5, a sixth switch S6, a seventh switch S9 and an eighth switch S10. The eight switches can be arranged as shown in FIG. 1, for example. Other suitable converter switch amounts and arrangements are contemplated herein. The first switch S1 and the second switch S2 can be connected to a neutral point N in parallel. The first switch S1, the seventh switch S9, and the third switch S3 can be connected to a first side (e.g., a positive side) of the flying capacitor Cf in parallel. The second switch S2, the eighth switch S10, and the sixth switch S6 can be connected to a second side (e.g., a negative side) of the flying capacitor Cf in parallel. The fourth switch S4 can be disposed in series with the third switch S3 and oriented in reverse (e.g., with diodes in the reverse direction). The fifth switch S5 can be disposed in series with the sixth switch S6 and oriented in reverse (e.g., with diodes in the reverse direction). The fourth switch S4 and the fifth switch S5 can be connected in parallel to a midpoint M between a first DC capacitor Cdc1 and a second DC capacitor Cdc2.

The control module 103 can be configured to determine which switches to turn on or off based on whether the flying capacitor voltage Vfca is above or below the target voltage Vref or target voltage range. In certain embodiments, the first modulator module 125a can be configured to control the fourth switch S4, the sixth switch S6, the seventh switch S9 and the eighth switch S10, e.g., as shown. The second modulator module 125b can be configured to control the first switch S1 and the second switch S2, for example.

FIG. 2A shows a schematic diagram showing an embodiment of switch logic relative to two reference signals and two duty cycle command lines. As shown, the modulator modules 125a, 125b can be configured to switch states of certain switches when certain reference signals 131a, 131b cross certain duty command signal 123a, 123b based on the state (e.g., charging state B or discharging state C) and based on the current polarity. FIG. 2B shows an example of switching control for charging the flying capacitor Cf. FIG. 2C shows an example of switching control for discharging the flying capacitor Cf.

FIG. 3 shows an embodiment of a logic table used by embodiments of modulator modules to control switching in accordance with this disclosure. The table of FIG. 3 shows redundant switching state and duty cycle selection of the converter switches, based on the sensed voltage and current. Each modulator module 125a, 125b can include this table and/or have access to reference this table and modify its control logic based on the current polarity as shown. For example, the modulator modules 125a, 125b can switch which group of switches they control based on the polarity of the current for each of charging and discharging (e.g., positive current being shown in the embodiment of FIGS. 2A-2C).

Embodiments can include a PWM scheme and the redundant state (State B Charging and State C Discharging) based voltage balance by charge/discharge of the flying capacitor. The control module 103 is configured to balance state B and state C to maintain flying capacitor voltage to about the reference voltage. While certain states of operation are shown in FIGS. 2B and 2C, mirrored states can be used for reverse current direction. For example, switch $S_{10}$ is shown not in use to effect charging or discharging, but if current direction was opposite, this switch can be controlled for charging, for example (e.g., mirror state of FIG. 2B).

In certain embodiments, when flying capacitor voltage Vfca exceeds Vref (e.g., exactly or within a range), the switches are controlled to discharge, and vice versa. For example, the charge state of the flying capacitor can continually oscillate around Vref, and the tightness of oscillation (how close the voltage stays to Vref) can be a function of the gains of the gain module.

In accordance with at least one aspect of this disclosure, an aircraft (not shown) can include a bidirectional converter system, e.g., system 100. The system can include any suitable embodiment of a system disclosed herein, e.g., system 100 as described above.

Embodiments can provide flying capacitor voltage balance in multi-level power converters, for example. Embodiments can balance the flying capacitor voltage Vcfa at every switching cycle, for example, which can provide for size reduction of the flying capacitor to achieve higher power density. Embodiments can provide fast and accurate voltage control of the flying capacitor under fast changing operating condition. Embodiments can include a closed loop technique.

Embodiments can include a flying capacitor based 5-level active neutral point clamped converter (ANPC). The flying capacitor can provide the additional voltage level and the neutral point can be balanced by the active switches and their redundant voltage states.

Embodiments can include a circuit for a multilevel inverter (e.g., for driving an electric motor) that has a flying capacitor Cf (e.g., on each level). Whenever the circuit is operating, the capacitor voltage can change depending on the operating voltage (e.g., if load changes, if input voltage changes, etc.). A change in the capacitor voltage would change output voltage, so embodiments can be configured to provide a substantially constant capacitor voltage to maintain a constant output voltage. As shown, there can be a flying capacitor Cf on all phase layers and the DC link input capacitors Vdc1 Vdc2 can be shared with all phases.

Certain embodiments can include a flying capacitor voltage balancing technique that can utilize a pulse width modulation (PWM) scheme and a robust proportional integral (PI) based controller to realize switching cycle to cycle voltage balance. In certain embodiments, the error voltage difference between the reference voltage ($V_{ref}$) and the sensed voltage of the flying capacitor ($V_{fca}$) can be used by a robust PI controller to estimate the equivalent duty cycle which is required to carry out the voltage balance of the flying capacitor. The estimated value can be multiplied with the sign of the current polarity to obtain a new parameter Δd which can be combined appropriately with the original duty cycle to generate the effective duty for the modulators (modulator for S9, S10, S4 and S6, and modulator for S1, and S2) which are responsible for generating the gating signal for various switches. Embodiments can include a voltage sensor for each flying capacitor on each phase.

In certain embodiments, the PWM scheme is based on redundant states of the converter which can generate the same voltage (e.g., $1/4^{th}$ of the DC link voltage=U/4) but can either charge (State B) or discharge (State C) the flying capacitor. By changing the combination of switches, the redundant sates can be realized, and by controlling the duration of these states the flying capacitor can be charged or discharged to maintain the voltage across it. An embodiment of switching states and corresponding duty estimation based on the direction of the voltage and current information is presented in table of FIG. 3, for example. In certain embodiments, the duty parameter $\Delta d$ can be estimated in a closed loop fashion from the flying capacitor voltage error information. The duty parameter can then be appropriately added or subtracted from the original duty cycle command for generation of U/4 (e.g., $\frac{1}{4}^{th}$ of the DC link voltage) to produce a duty command for these charge and discharge stages to achieve fast, accurate, and well-regulated voltage of the flying capacitor. Embodiments can achieve a very fast switching cycle to cycle voltage balance of the flying capacitor, therefore allowing use of a very small size capacitor with improved converter performance.

Embodiments solve the problem of voltage balance of flying capacitor based multi-level converter without using additional complex auxiliary circuits. Embodiments can achieve closed loop control of the flying capacitor voltage in a very fast and accurate manner under rapidly changing load conditions, such as in aerospace applications for example. Embodiments can achieve very a fast switching cycle to cycle voltage balance of the flying capacitor, therefore use of a very small size capacitor with improved converter performance. Embodiments can include a flying capacitor voltage balance scheme that enables realization of the benefits of flying capacitor based multi-level ANPC converter for a multi-level converter and realize the benefits of a flying capacitor based ANPC converter. For example, embodiments can include a very small flying capacitor (e.g., due cycle to cycle voltage control), high power density, low mass and volume, high efficiency, high power quality, low EMI, high switching frequency operation, and fault tolerant operations. Embodiments of a voltage balance scheme and implementation also do not require additional or auxiliary components to enable a low cost, high density, and high efficiency solution with high reliability for highly demanding applications, e.g., such as aerospace or electrified vehicles.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:
a bi-directional converter circuit comprising a plurality of switches and a flying capacitor configured to experience a low voltage or a high voltage, wherein the plurality of switches includes a first switch, a second switch, a third switch, a fourth switch, a fifth switch, and a sixth switch, wherein the first switch and the second switch are connected to a neutral point on a branch between a first node on a first side of the flying capacitor and a second node on a second side of the flying capacitor, wherein the first switch, the third switch, and the fourth switch are coupled on separate branches from the first node on the first side of the flying capacitor, and wherein the second switch, the fifth switch, and the sixth switch are coupled on separate branches from the second node on the second side of the flying capacitor; and
a control module operatively connected to the plurality of switches and configured to control a state of the plurality of switches, wherein the control module is configured to receive a sense signal indicative of a flying capacitor voltage and to control one or more switches of the plurality of switches to charge or discharge the flying capacitor to maintain a target voltage or target voltage range.

2. The system of claim 1, wherein the control module is configured to:
determine if the flying capacitor voltage is low and control the one or more switches of the plurality of switches to charge the flying capacitor until the flying capacitor voltage reaches the target voltage or target voltage range; and
determine if the flying capacitor voltage is high and control the one or more switches of the plurality of switches to discharge the flying capacitor until the flying capacitor voltage reaches the target voltage or target voltage range.

3. The system of claim 1, wherein the control module includes a sum block configured to compare the target voltage to the flying capacitor voltage indicated by the sense signal and to output a difference voltage signal.

4. The system of claim 3, wherein the control module includes a gain block configured to apply a predetermined gain to the difference voltage signal and to generate a gained different voltage signal.

5. A system, comprising:
a bi-directional converter circuit comprising a plurality of switches and a flying capacitor configured to experience a low voltage or a high voltage; and
a control module operatively connected to the plurality of switches and configured to control a state of the plurality of switches, wherein the control module is configured to receive a sense signal indicative of a flying capacitor voltage and to control one or more switches of the plurality of switches to charge or discharge the flying capacitor to maintain a target voltage or target voltage range;
wherein the control module includes:
a sum block configured to compare the target voltage to the flying capacitor voltage indicated by the sense signal and to output a difference voltage signal;
a gain block configured to apply a predetermined gain to the difference voltage signal and to generate a gained different voltage signal; and
a multiplication block configured to receive the gained difference voltage signal and multiply the gained difference voltage signal by a polarity of a circuit current, wherein the multiplication block is configured to output a duty parameter.

6. The system of claim 5, wherein:
the control module includes a first duty command sum block and a second duty command sum block configured to receive the duty parameter;
the first duty command sum block is configured to add the duty parameter to a duty command and to output a first modulator duty command signal; and
the second duty command sum block is configured to subtract the duty parameter from the duty command and to output a second modulator duty command signal.

7. The system of claim 6, wherein the control module includes:
a first modulator module configured to receive the first modulator duty command signal and to output a first control signal for each of a first group of switches of the plurality of switches; and
a second modulator module configured to receive the second modulator duty command signal and to output a second control signal for each of a second group of switches of the plurality of switches, wherein the first group of switches is different than the second group of switches.

8. The system of claim 7, wherein:
the first modulator module is configured to receive a first modulator reference signal;
the second modulator module is configured to receive a second modulator reference signal; and
the second modulator reference signal is off phase from the first modulator reference signal by 180 degrees.

9. The system of claim 8, wherein the first modulator reference signal and the second modulator reference signal are triangle waves.

10. The system of claim 8, wherein:
the plurality of switches includes a first switch, a second switch, a third switch, a fourth switch, a fifth switch, a sixth switch, a seventh switch, and an eighth switch;
the first switch and the second switch are connected to a neutral point on a branch between a first node on a first side of the flying capacitor and a second node on a second side of the flying capacitor;
the first switch, the seventh switch, and the third switch are connected to the first node on the first side of the flying capacitor on separate branches from the first node;
the second switch, the eighth switch, and the sixth switch are connected to the second node on the second side of the flying capacitor on separate branches from the second node;
the fourth switch is disposed in series with the third switch and oriented in reverse;
the fifth switch is disposed in series with the sixth switch and oriented in reverse; and
the fourth switch and the fifth switch are connected to a midpoint between a first DC capacitor and a second DC capacitor.

11. The system of claim 10, wherein the control module is configured to determine which switches to turn on or off based on whether the flying capacitor voltage is above or below the target voltage or target voltage range.

12. The system of claim 11, wherein:
the first modulator module is configured to control the fourth switch, the sixth switch, the seventh switch, and the eighth switch; and the second modulator module is configured to control the first switch and the second switch.

13. A system, comprising:
a bi-directional converter circuit comprising a plurality of switches and a flying capacitor configured to experience a low voltage or a high voltage, wherein the plurality of switches includes (i) a first pair of switches configured to electrically couple a first side of the flying capacitor to ground and being oriented in reverse relative to one another, (ii) a second pair of switches configured to electrically couple a second side of the flying capacitor to ground and being oriented in reverse relative to one another, and (iii) a first switch, a second switch, a third switch, and a fourth switch, wherein the first switch and the second switch are connected to a neutral point on a branch between a first node on a first side of the flying capacitor and a second node on a second side of the flying capacitor, wherein the first switch, the third switch, and the first pair of switches are coupled on separate branches from the first node on the first side of the flying capacitor, and wherein the second switch, the fourth switch, and the second pair of switches are coupled on separate branches from the second node on the second side of the flying capacitor; and
a control module operatively connected to the plurality of switches and configured to control a state of the plurality of switches, wherein the control module is configured to receive a sense signal indicative of a flying capacitor voltage and to control one or more switches of the plurality of switches to charge or discharge the flying capacitor to maintain a target voltage or target voltage range.

14. The system of claim 13, wherein the control module is configured to:
determine if the flying capacitor voltage is low and control the one or more switches of the plurality of switches to charge the flying capacitor until the flying capacitor voltage reaches the target voltage or target voltage range; and
determine if the flying capacitor voltage is high and control the one or more switches of the plurality of switches to discharge the flying capacitor until the flying capacitor voltage reaches the target voltage or target voltage range.

15. The system of claim 13, wherein the control module includes a sum block configured to compare the target voltage to the flying capacitor voltage indicated by the sense signal and to output a difference voltage signal.

16. The system of claim 15, wherein the control module includes a gain block configured to apply a predetermined gain to the difference voltage signal and to generate a gained different voltage signal.

17. The system of claim 16, wherein:
the control module includes a multiplication block configured to receive the gained difference voltage signal and multiply the gained difference voltage signal by a polarity of a circuit current; and
the multiplication block is configured to output a duty parameter.

18. The system of claim 17, wherein:
the control module includes a first duty command sum block and a second duty command sum block configured to receive the duty parameter;
the first duty command sum block is configured to add the duty parameter to a duty command and to output a first modulator duty command signal; and the second duty command sum block is configured to subtract the duty parameter from the duty command and to output a second modulator duty command signal.

19. The system of claim 18, wherein the control module includes:
a first modulator module operatively configured to receive the first modulator duty command signal and to output a first control signal for each of a first group of switches of the plurality of switches; and
a second modulator module configured to receive the second modulator duty command signal and to output a second control signal for each of a second group of switches of the plurality of switches, wherein the first group of switches is different than the second group of switches.

20. The system of claim 19, wherein:
the first modulator module is configured to receive a first modulator reference signal;
the second modulator module is configured to receive a second modulator reference signal; and
the second modulator reference signal is off phase from the first modulator reference signal by 180 degrees.

21. The system of claim 1, wherein:
a first modulator is configured to control the third switch, the fourth switch, the fifth switch, and the sixth switch; and
a second modulator is configured to control the first switch and the second switch.

* * * * *